C. H. F. KRUSE.
APPARATUS FOR SHAPING PANTALOONS.
No. 180,244.                           Patented July 25, 1876.
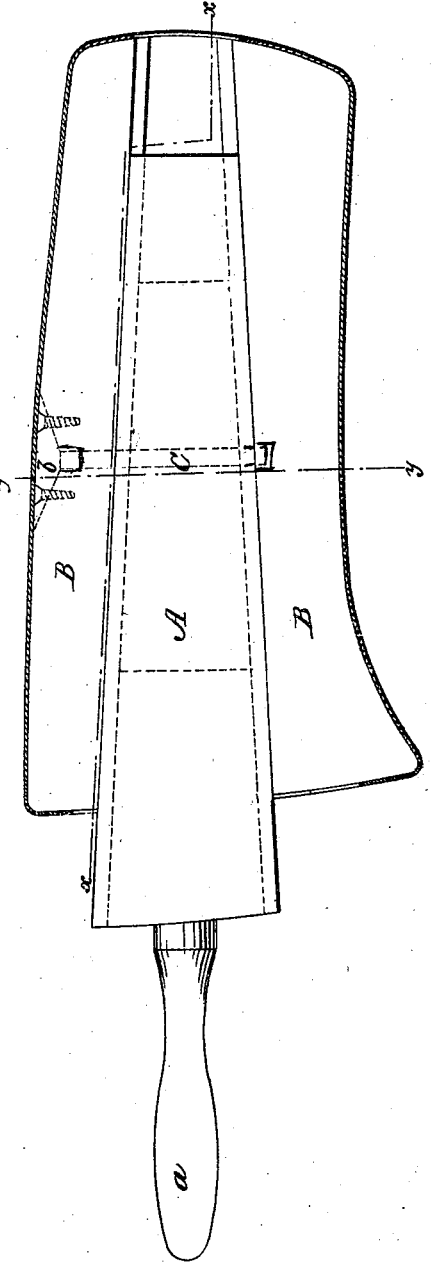
Witnesses:
Inventor:
Charles H. F. Kruse.

UNITED STATES PATENT OFFICE.

CHARLES H. F. KRUSE, OF FISHKILL LANDING, NEW YORK.

IMPROVEMENT IN APPARATUS FOR SHAPING PANTALOONS.

Specification forming part of Letters Patent No. 180,244, dated July 25, 1876; application filed April 27, 1876.

*To all whom it may concern:*

Be it known that I, CHARLES H. F. KRUSE, of Fishkill Landing, in the State of New York, have invented an Apparatus for Shaping Pantaloon Spring-Bottoms; and the following is a full and complete description of the same, to enable others skilled in the art to make and use the same, reference being had to the accompanying drawings and the letters of description marked thereon.

Figure 1 is a sectional elevation; Fig. 2, a longitudinal section on line $x\,x$ of Fig. 1; and Fig. 3, a cross-section on line $y\,y$, Fig. 1.

The invention is an improvement in devices for stretching the bottoms of pantaloon-legs, and imparting to them a certain desired shape. The device is composed of three parts—to wit, a sliding wedge and two formers or forming-pieces, attached to the wedge in such manner that by adjusting the latter the width of the board is increased or lessened accordingly.

The thin wedge A has a handle, $a$, attached to its larger end, and is provided with a dove-tailed groove on each edge, to receive the corresponding ribs formed on the inner edge of each of the formers or forming-pieces B. The latter are connected by the bar C, which extends transversely through the lengthwise slot in the wedge A. The bar C is confined or secured in place by means of a triangular block, $b$, inserted in a like-shaped cavity in the side of one of the formers B. The three parts A B B are preferably incased by an elastic fabric, $d$.

The manner of use of the board is readily apparent. The wedge A being drawn out as far as the bar C will permit, the board is inserted in lower end of one of the pantaloons to be stretched. The wedge is then pushed in till the formers B B are spread apart sufficiently to stretch the fabric tightly over the board. The board is allowed to remain in the pantaloons a shorter or longer time, as required to impart the desired shape.

What I claim is—

The improved stretcher and former for pantaloons, composed of the grooved and slotted wedge A, the ribbed pieces B B attached thereto, and the bar C, all combined and connected as shown and described.

CHARLES H. F. KRUSE.

Witnesses:
H. WEHLE,
HENRY FUEHRER.